Dec. 17, 1929.    J. R. BARTHOLOMEW    1,739,496

AUTOMOTIVE BRAKE

Filed Oct. 30, 1925

INVENTOR
JOHN R. BARTHOLOMEW
BY Wm. N. Cady
ATTORNEY

Patented Dec. 17, 1929

1,739,496

UNITED STATES PATENT OFFICE

JOHN R. BARTHOLOMEW, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed October 30, 1925. Serial No. 65,804.

This invention relates to motor driven road vehicles and trailers.

It has heretofore been proposed to provide a trailer vehicle having wheels at one end and having means whereby the other end of the trailer may be supported by a motor driven vehicle. It has also been proposed to provide the trailer with an auxiliary pair of wheels which are connected to rotatable legs, so that the operator may back the power truck under the trailer and then rotate the legs so as to raise the auxiliary wheels off the ground when the trailer is to be moved and then, when the trailer is brought to its destination, the legs are rotated to cause the auxiliary wheels to engage the ground, so as to support the trailer when the power truck is moved away.

One object of my invention is to provide means for controlling the operation of connecting the trailer to and disconnecting the same from the truck.

Another object of my invention is to provide means operable with the brakes for controlling the connection and disconnection of the trailer to and from the power truck.

Figure 1:
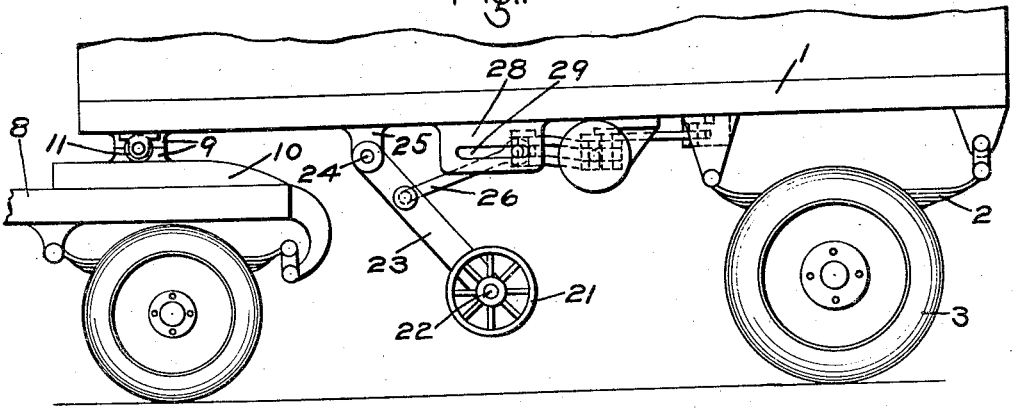
Figure 2:
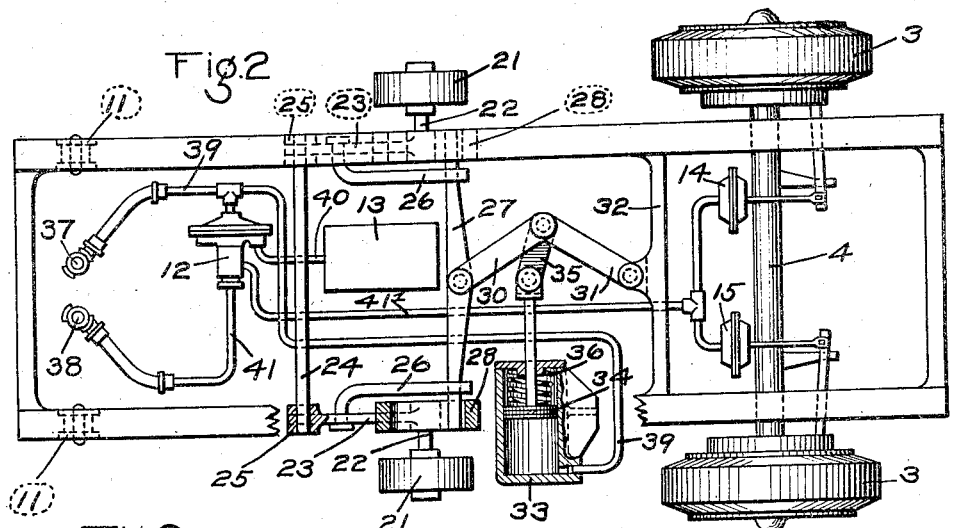

In the accompanying drawing; Fig. 1 is a side elevation of a trailer supported by the rear end of a power vehicle and equipped with my invention; Fig. 2 a plan view, partly in section, of the trailer shown in Fig. 1; and Fig. 3 a central sectional view of the controlling valve device employed in connection with the fluid pressure brakes on the trailer.

As shown in the drawing, the trailer may comprise a frame 1 supported at the rear end, through the medium of springs 2, by a pair of truck wheels 3 mounted on an axle 4. The front end of the trailer is supported by and pivotally connected to the rear end of a power vehicle 8, by means of a suitable fifth wheel mechanism 9. Disposed on the power vehicle at opposite sides of the mechanism 9 are ramps 10. Secured to the under side of the trailer frame are rollers 11 adapted to engage the ramps 10, so that when the power vehicle is backed under the trailer, said rollers gradually raise the trailer to a position so that the fifth wheel mechanism is locked in place.

The trailer is equipped with a fluid pressure brake apparatus including an emergency valve device 12, an emergency reservoir 13, brake chambers 14 and 15, an emergency pipe 39 having a flexible hose coupling 37, and a straight air pipe 41 having a flexible hose coupling 38, said hose couplings being adapted to be coupled with corresponding couplings on the power vehicle.

Figure 3:
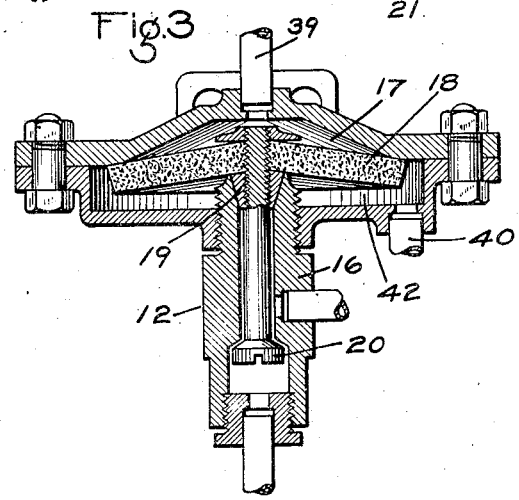

The emergency valve device 12, as shown in Fig. 3, may comprise a casing 16 containing a flexible diaphragm 18 with a chamber 17 on one side connected to emergency pipe 39 and a chamber 42 on the opposite side connected by pipe 40 to emergency reservoir 13. The diaphragm 18 is adapted to operate an emergency supply valve 19 and an exhaust controlling valve 20.

Secured to the under side of vehicle frame 1 near the forward end are brackets 25 in which is mounted a rotatable shaft 24, and carried by said shaft is an auxiliary support structure comprising a pair of depending legs 23, preferably having pins 22, which carry wheels 21. Pivotally connected to legs 23 are links 26, which are pivotally connected at their opposite ends to a bar 27. Also secured to the under side of frame 1 are brackets 28 having slots 29 for receiving the ends of bar 27 so that said bar can move horizontally in said slots.

Two pivotally connected arms 30 and 31 are provided, the free end of arm 30 being pivotally connected to the central portion of bar 27, while the free end of arm 31 is pivotally connected to a cross member 32 of the trailer frame, thereby providing a toggle joint for operation of bar 27.

In order to operate the toggle joint, I provide a cylinder 33 containing a piston 34, the stem of which is pivotally connected by a link 35 to the pivotal connection of the toggle joint, and said piston is subject on one side to the pressure of fluid in the emergency brake pipe 39 which is connected to cylinder 33 and on the opposite side to the pressure of a coil spring 36.

In operation, when hose couplings 37 and 38 are connected to corresponding hose couplings on the power vehicle and when fluid under pressure is supplied to the emergency brake pipe 39, fluid flows through hose coupling 37 to emergency brake pipe 39 on the trailer and thence to chamber 17 of emergency valve device 12, where it acts on diaphragm 18 so as to seat valve 19, and also operates to deflect the edges of said diaphragm so that fluid is permitted to flow past the edges to chamber 42 and thence through pipe 40 to emergency reservoir 13, charging the same.

Fluid under pressure from pipe 39 is also supplied to cylinder 33, where it acts to shift piston 34 outwardly, which then operates through the toggle joint to shift bar 27 rearwardly in the slot 29. This movement of bar 27 acts through the links 26 to raise the legs 23 and consequently the wheels 21 to the position shown in Fig. 1 of the drawing.

With the brake pipe 39 charged with fluid under pressure and the wheels 21 held off the ground by the fluid pressure acting on piston 34, the emergency valve device 12 is in the position shown in Fig. 3, in which valve 19 is held seated, so as to cut off communication from chamber 42 and the reservoir pipe 40 to the pipe 41', and the valve 20 is held unseated, so that the pipe 41' is connected to the pipe 41. While the emergency valve device remains in this position, the brakes may be applied by supplying fluid under pressure from the power vehicle through pipes 41 and 41' to the brake cylinder, or released by connecting the pipe 41 to the atmosphere, the power vehicle being provided with controlling means of the well known type, for supplying and releasing fluid under pressure to and from the pipe 41.

The wheels 21 will be maintained in this position as long as fluid under pressure is supplied to cylinder 33. However, when the hose connections are uncoupled, fluid under pressure from pipe 39 and consequently cylinder 33 will be vented to atmosphere, thereby permitting the spring 36 acting on the opposite side of piston 34 to shift said piston to its innermost position, which acts to straighten arms 30 and 31 and consequently to shift bar 27 forwardly in the slot 29. This movement of bar 27 acts through links 26 to move legs 23 to a vertical position, so that the wheels 21 are in position to support the front end of the trailer. The power vehicle may then be pulled away, as will be evident.

The reduction in pressure in the emergency brake pipe 39 also operates the emergency valve device 12, so that the valve 20 is moved to its seat and the valve 19 is opened. Fluid under pressure is then supplied from the main reservoir 13 through pipe 40 and past the open valve 19 to pipe 41' and the brake chambers 14 and 15. An application of the brakes is thus effected when the auxiliary support is lowered, so that the trailer will be held against movement, when the power truck is pulled away.

When it is desired to connect the trailer to a power truck, the truck is backed under the trailer so that the fifth wheel mechanism is in alinement, the trailer being lifted by the movement of the rollers 11 on the ramps 10. The couplings 37 and 38 are then connected to corresponding couplings on the power truck, and then when fluid under pressure is supplied to the emergency brake pipe 39, the piston 34 is operated so as to rotate the auxiliary support out of its supporting position.

While wheels 21 are preferably employed, it will be evident that the wheels may be dispensed with, in which case the ends of legs 23 are adapted to engage the ground.

Having now described my invention, what I claim as new and desire to secure by Letters Patent, is:—

1. The combination with a trailer vehicle having one end adapted to be supported by a power vehicle, of an auxiliary support for said end of the trailer vehicle and pivotally mounted on the trailer vehicle for rotation into and out of engagement with the ground, a toggle lever operatively connected to said support, a cylinder mounted on the trailer vehicle, a piston in said cylinder connected to said toggle lever, and means for supplying and releasing fluid under pressure to and from said cylinder.

2. The combination with a trailer vehicle having an auxiliary supporting mechanism for supporting one end of the vehicle, of a fluid pressure brake system carried by said vehicle, and means operated by variations in fluid pressure in said brake system for controlling the operation of said supporting mechanism.

3. The combination with a trailer vehicle having an auxiliary supporting mechanism for supporting one end of the vehicle, of a pipe line on the vehicle, a brake device operated upon a reduction in fluid pressure in said pipe line for applying the brakes on the vehicle, and means operated by the fluid pressure in said pipe line for controlling the operation of said supporting mechanism.

4. The combination with a trailer vehicle having one end adapted to be supported by a power vehicle, of an auxiliary support for said end and movable to engage the ground, fluid pressure operated means on the trailer for shifting said support to engage the ground, a brake on the trailer, and means controlled from the power vehicle for releasing fluid from said fluid pressure means and for applying the brake on the trailer vehicle.

5. The combination with a trailer vehicle having an auxiliary supporting mechanism for supporting one end of the vehicle, of a fluid pressure brake system carried by said vehicle, and means operated while the brakes are applied for shifting said supporting mechanism to its supporting position.

In testimony whereof I have hereunto set my hand.

JOHN R. BARTHOLOMEW.